(12) United States Patent
Forgue

(10) Patent No.: US 7,467,549 B2
(45) Date of Patent: Dec. 23, 2008

(54) ELECTROSTATIC CHARGE CONTROL FOR IN-TANK FUEL MODULE COMPONENTS

(75) Inventor: John R. Forgue, Cheshire, CT (US)

(73) Assignee: TI Group Automotive Systems, LLC, Warren, MI (US)

( * ) Notice: Subject to any disclaimer, the term of this patent is extended or adjusted under 35 U.S.C. 154(b) by 381 days.

(21) Appl. No.: 11/389,899

(22) Filed: Mar. 27, 2006

(65) Prior Publication Data

US 2006/0219004 A1 Oct. 5, 2006

Related U.S. Application Data

(63) Continuation-in-part of application No. 11/120,554, filed on May 3, 2005, now Pat. No. 7,140,247.

(60) Provisional application No. 60/668,313, filed on Apr. 5, 2005.

(51) Int. Cl.
*G01F 23/00* (2006.01)

(52) U.S. Cl. .............. 73/313; 73/305; 123/509

(58) Field of Classification Search .......... 73/313, 73/305, 314; 123/509
See application file for complete search history.

(56) References Cited

U.S. PATENT DOCUMENTS

| | | |
|---|---|---|
| 3,186,551 A | 6/1965 | Dornauf |
| 3,418,991 A | 12/1968 | Shultz et al. |
| 4,157,038 A | 6/1979 | Yamamoto |
| 4,999,108 A | 3/1991 | Koch et al. |
| 5,076,920 A | 12/1991 | Danowski et al. |
| 5,164,879 A | 11/1992 | Danowski et al. |
| 5,195,494 A | 3/1993 | Tuckey |
| 5,547,330 A | 8/1996 | Walimaa et al. |
| 5,642,718 A | 7/1997 | Nakai et al. |
| 5,647,330 A | 7/1997 | Sawert et al. |
| 5,785,032 A | 7/1998 | Yamashita et al. |
| 6,047,685 A | 4/2000 | Schelhas et al. |
| 6,099,726 A | 8/2000 | Gembolis et al. |
| 6,164,267 A | 12/2000 | Okada et al. |

(Continued)

FOREIGN PATENT DOCUMENTS

JP 8232792 A 9/1996

(Continued)

*Primary Examiner*—Hezron Williams
*Assistant Examiner*—Rodney T Frank
(74) *Attorney, Agent, or Firm*—Leydig, Voit & Mayer, Ltd.

(57) ABSTRACT

A grounding arrangement for an in-tank fuel system includes a fuel level sensor assembly of a fuel module comprising a conductive card body and a resister card supported on the conductive card body. The resister card includes a conductive trace in conductive contact with the conductive card body. The card body is conductively connected to a conductive fuel module component. The trace is adapted to be connected to the ground plane of a vehicle. Other traces on the resister card are in the electrical circuit of the fuel level sensor assembly. The fuel module further includes a conductive blade having a knife edge and in conductive contact with a conductive fuel module component. The knife edge cuts through the insulation of an insulated conductor to allow the knife edge to be in contact with the conductive element of the conductor.

17 Claims, 11 Drawing Sheets

U.S. PATENT DOCUMENTS

| | | |
|---|---|---|
| 6,168,713 B1 | 1/2001 | Sekine et al. |
| 6,206,035 B1 | 3/2001 | Wehner et al. |
| 6,216,671 B1 | 4/2001 | Sawert et al. |
| 6,220,227 B1 | 4/2001 | Okada et al. |
| 6,382,190 B1 | 5/2002 | Tanabe et al. |
| 6,435,163 B1 | 8/2002 | Fauser et al. |
| 6,453,870 B1 | 9/2002 | Koller et al. |
| 6,464,870 B1 | 10/2002 | Castellanos et al. |
| 6,613,227 B2 | 9/2003 | Rickle |
| 6,618,713 B1 | 9/2003 | Woodall |
| 6,679,227 B2 | 1/2004 | Sawert et al. |
| 6,740,236 B2 | 5/2004 | Rickle et al. |
| 6,762,245 B2 | 7/2004 | Bonnet et al. |
| 6,802,301 B2 | 10/2004 | Fauser et al. |
| 6,877,373 B2 | 4/2005 | Gilmour et al. |
| 7,089,918 B2 * | 8/2006 | Gilmour et al. ............. 123/509 |
| 7,140,247 B2 * | 11/2006 | Forgue et al. ................. 73/313 |
| 2003/0131828 A1 | 7/2003 | Crary |

FOREIGN PATENT DOCUMENTS

| | | |
|---|---|---|
| JP | 9032674 A | 2/1997 |
| WO | WO 93/23665 A1 | 11/1993 |

* cited by examiner

FIG. 9
FIG. 10
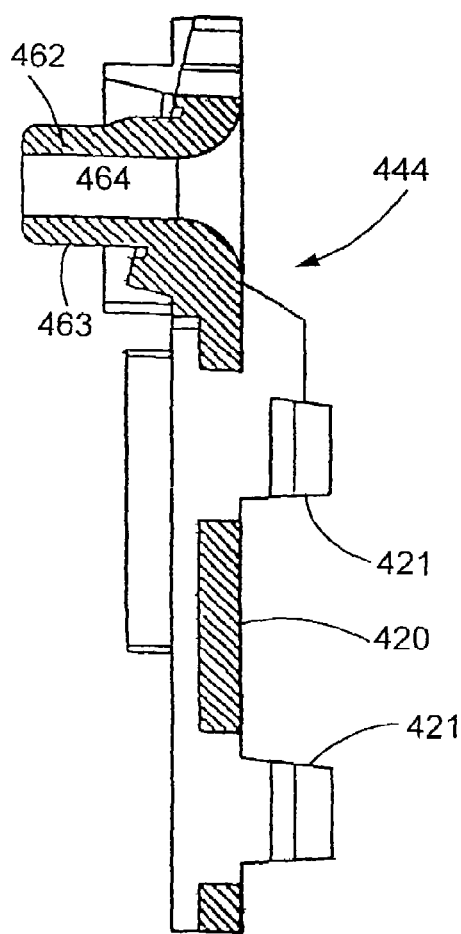
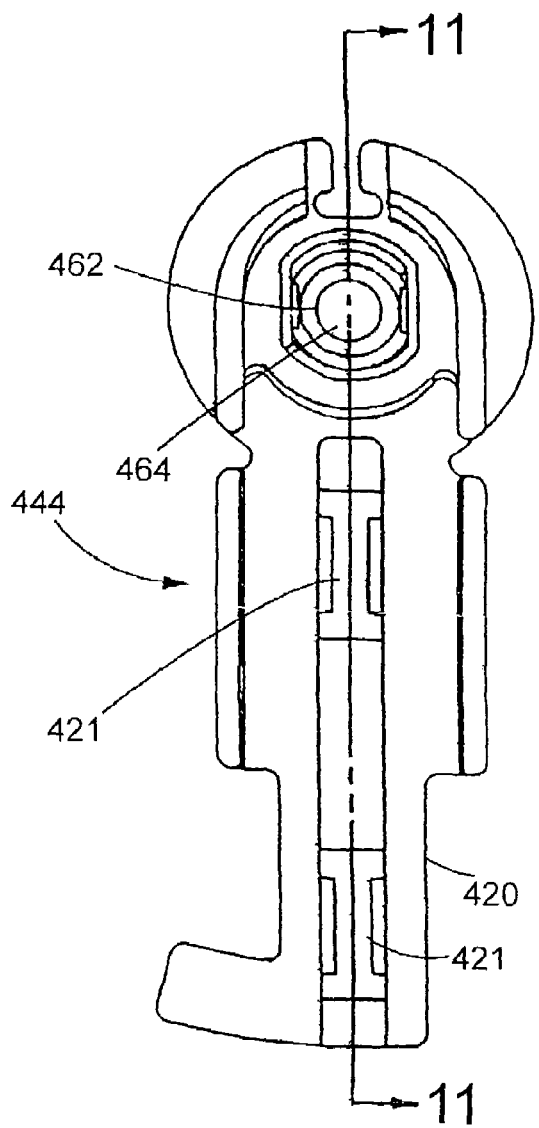

ELECTROSTATIC CHARGE CONTROL FOR IN-TANK FUEL MODULE COMPONENTS

This application is a continuation-in-part of U.S. patent application Ser. No. 11/120,554, filed on May 3, 2005, and also claims the benefits under Title 35 USC § 120 based on U.S. Provisional Application No. 60/668,313, filed on Apr. 5, 2005.

BACKGROUND OF THE INVENTION

Pending application for U.S. patent Ser. No. 10/441,213 discloses structure for providing an electrostatic discharge path to ground of various components within a vehicular in-tank fuel module.

The present invention similarly relates to in-tank fuel modules having components made of plastic or polymeric materials. More specifically, it relates to in-tank fuel modules arranged to prevent the accumulation of and provide for the safe dissipation of electrostatic charges that might be generated as a result of fuel flow.

The in-tank fuel module for a fuel tank of a vehicle or other device employing an internal combustion engine typically includes a plurality of separate components, such as a reservoir, a fuel pump and motor, fuel filter and housing, a pressure regulator and housing, an aspiration jet pump and the like. It can happen that such components are made of non-conductive materials or may include elements that are electrically conductive; but, the electrically conductive element is electrically insulated from the associated electrical circuit that defines a ground plane. For instance, the conductive component may be disposed within or mounted on a non-conductive body, that is, a component that lacks sufficient conductivity to create a path to dissipate an electrostatic charge.

Conductive, as well as non-conductive components of an in-tank fuel module are susceptible of accumulating an electrostatic charge. It is well known to employ an arrangement that provides for dissipation of such static charge to prevent excessive build-up. Various examples are described in U.S. Pat. Nos. 5,076,920; 5,647,330; 5,785,032; 6,047,685; 6,206,035 and 6,435,163.

As the investigation of electrostatic charge build-up in in-tank fuel modules proceeds, refinements in the overall scheme for protection evolve. The present invention results from this process. Not only does it recognize the advantage to be derived from implementing such protection in areas not previously considered significant, it also provides enhanced mechanisms for accomplishing an overall improvement in the protection afforded.

To control build-up of the electrostatic charge in the components of an in-tank fuel module, it is known in the art to electrically connect the component to the vehicle ground plane, usually to the negative terminal of the battery that defines that electrical plane. It is known to use metal wires to electrically connect the components to the ground, or to other grounded conductive components that are connected to the vehicle ground plane. It is contemplated by this invention to provide new arrangements for providing such a ground path.

The fuel level sensor detects the fuel level in a fuel tank, usually through a float and pivotal arm physically located in or on the in-tank fuel module. An electric circuit having a variable resistance card is used. A movable cross bar or contact member coacts with the resister card to alter the circuit characteristics to change the reading on a fuel gauge. This circuit includes an electrical path that is extant within the module and is ultimately connected to the ground plane. It provides a previously unrecognized path for electrostatic charge dissipation.

Moreover, the fuel level sensor assembly usually includes a metallic float arm Since the float arm is formed of a metallic material, the float arm is susceptible of collecting electrostatic charge. However, since the wiper retainer and the base are formed of a non-conductive plastic, any electrostatic charge collected in the metallic arm is unable to dissipate to the circuit ground plane. Connection of the metallic float arm to a conductor of the level sensor circuit resident in the module is a solution to both the problem of undesirable electrostatic accumulation and provision of an effective electrostatic charge dissipation path.

BRIEF DESCRIPTION OF THE DRAWINGS

FIG. 9 is a sectional view of the contact carrier element of the fuel sensor of FIG. 5.

FIG. 10 is a front view of the contact carrier element of the fuel level sensor assembly of FIG. 5.

DETAILED DESCRIPTION OF THE ILLUSTRATED EMBODIMENTS

Figure 1:
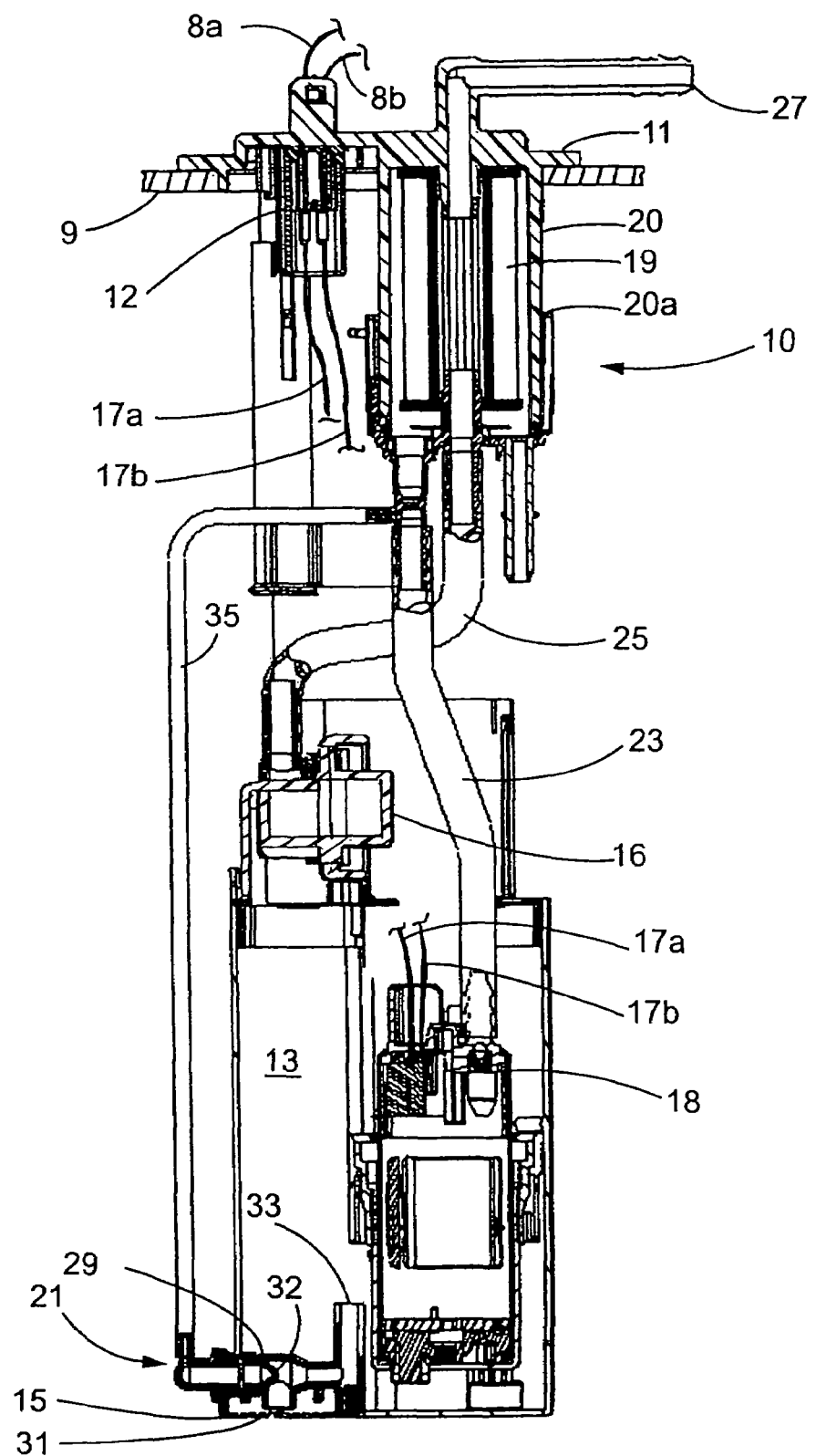
FIG. 1 is a front view, partially in cross section, and partially broken away, of an in-tank fuel module illustrating various principles of the present invention.

In the embodiment of FIG. 1, there is disclosed an in-tank fuel module 10 adapted to be positioned in a fuel tank 9 associated with an internal combustion engine. Though the main application of such an arrangement is for a vehicle, the invention has application to other apparatus powered by an internal combustion engine, such as a stationary or auxiliary power unit, engine driven pump or electric generator.

The module 10 includes a flange 11 connecting the module to fuel tank 9. The module further includes a fuel reservoir 13, a fuel pump and motor 18, a fuel filter housing 20 in which there is positioned a fuel filter 19, a fuel pressure regulator 16, and an aspiration jet pump 21. These components are connected by hoses 23 or 25. The module communicates fuel from the main tank 9 to the vehicle engine though the pump and motor 18 to the filter housing 20 for delivery to the engine through an outlet connector 27.

Flange 11 supports an electrical receptacle 12. It receives power from the electrical system associated with the engine. The electrical system includes leads 8a and 8b that plug into receptacle 12. One lead, 8a, represents the negative side of the battery of the electrical system and is considered representative of the system ground plane.

Fuel pump and motor 18 are supported in the reservoir 13. Power to the motor is supplied through electrical leads 17a and 17b connected to electrical receptacle 12. Lead 17a is connected to the negative lead 8a and is thus connected to the vehicle ground plane. Lead 17b is connected to the positive side of the battery through lead 8b and is considered the "hot" or power lead.

The flange 11 and reservoir 13 are connected by a relatively slidable connection to permit adjustment of the overall vertical extent of the module. This slidable connection is not shown in FIG. 1, but is well known in the art. It permits the reservoir 13 to move toward or away from flange 11 for association of the module with fuel tanks of different vertical height.

In the module illustrated, the fuel filter housing 20 and included filter 19 are connected to the flange 11. In other arrangements, the filter housing may be connected to the reservoir 13.

As shown in FIG. 1, the filter housing 20 supports filter 19. Fuel enters the filter housing 20 from hose 23 that is connected to the pump and motor 18. Pressurized fuel passes through the filter 19 and exits the filter through outlet connector 27 for delivery to the engine.

To prevent build-up of electrostatic charge and provide for its dissipation, the lower portion 20a of filter housing 20 may be made of conductive polymeric material such as acetal (polyoxymethylene or POM) with a conductive filler. This conductive portion 20a of the housing 20 is connected to the vehicle ground plane at lead 17a in a well known manner by an insulated metal wire (not shown). Of course, any other form of connection of the conductive portion 20a to the electrical circuit ground plane would be acceptable.

The reservoir 13 maintains a level of fuel for supply to the fuel pump and motor 18. It includes an inlet defined by a screen 15 at the bottom of the reservoir maintained in spaced relation to the tank bottom. Fuel enters the inlet 15 from fuel tank 9, usually as a result of the head from the quantity of fuel in the tank 9. When the level of fuel in the fuel tank is low, jet aspiration pump 21 draws, or aspirates, fuel from the fuel tank 9 into the reservoir 13.

After fuel passes through filter 19, it can also exit the housing 20 through hose 25 to pressure regulator 16. The regulator controls pressure of the fuel delivered to the engine through the outlet connector 27 by passing some fuel back to the reservoir 13 when the pressure exceeds a set amount. This is a supply side jet pump system. The invention here, is of course, applicable to systems with return side jet pumps.

Jet aspiration pump 21 includes a body 29 that is hollow and defines a restricted orifice or venturi. The body also defines an inlet 31 open to the fuel in the tank 9 at the reservoir inlet 15, and an outlet 33 open to the reservoir 13.

High pressure fuel in hose 25 is delivered through another hose 35 to the jet orifice 32 which directs flow at high speed to the venture at 90 degrees to the fuel path entering the inlet 19. The flowing fuel aspirates fuel from tank 9 into the inlet 31 of body 29. That fuel is delivered to the reservoir 13 through outlet 33.

Aspirator jet pump 21 is made of conductive polymeric material such as acetal with carbon fibril, or other conductive filler or nylon with a suitable conductive filler. Such conductive material is used to form the body 29 including the venturi and the portions of the body defining inlet 31 and outlet 33. The aspiration jet pump 21 is connected to the ground plane using any suitable means, such as insulated metal wire. Alternatively, the entire reservoir 13 and other module components could be molded of conductive polymeric material to provide a dissipation path for any electrostatic charge that might be generated as a result of fuel flow in the aspiration jet pump 21.

Figure 2:
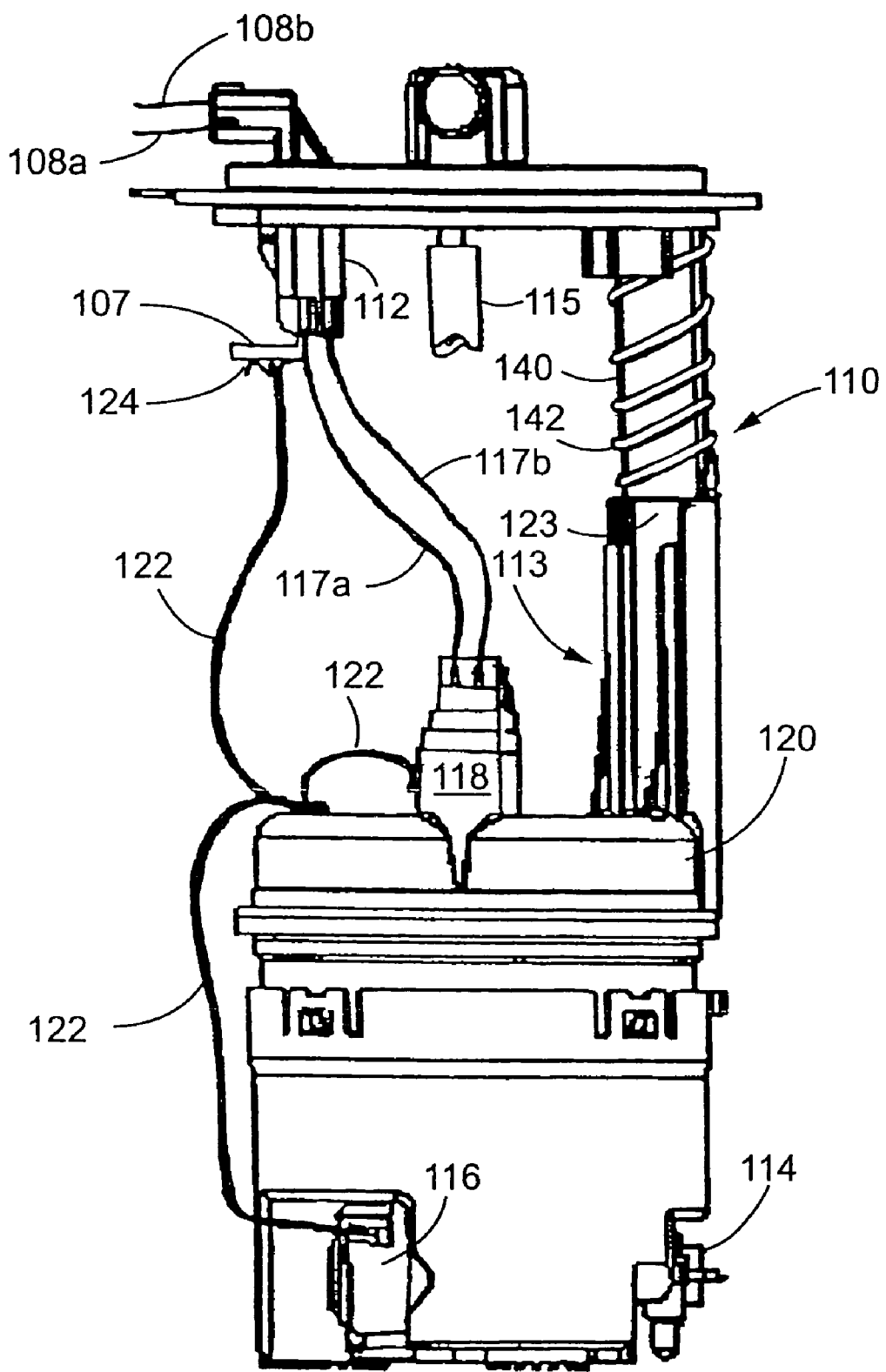
FIG. 2 is a partially broken away front view of another type of in-tank fuel module illustrating details of an embodiment of the present invention.

FIG. 2 shows another form of an in-tank fuel module having a plurality of separate components. The fuel module 110, includes a fuel level sensor assembly 114, a fuel pressure regulator 116, a fuel pump and motor 118 and a fuel filter housing 120 which houses a fuel filter (not shown).

An electrical plug or receptacle 112 is provided for connection to the vehicle electrical system. It includes at least a positive and a negative terminal. Positive and negative leads 117a and 117b connect to the pump motor 118. The ground terminal lead 117a is electrically connected to a grounded portion of a vehicle or other chassis, which is, in turn connected to the negative terminal of the battery through lead 108a. Terminal lead 117b is connected to the positive side of the circuit through lead 108b.

A conductive bracket 107 is provided that is attached to lead 117a.

The fuel pressure regulator 116, the fuel pump and motor 118 and the fuel filter housing 120 all may be components or include elements in or on which accumulation of electrostatic charge may occur. To dissipate the electrostatic charge from the fuel pressure regulator 116, the fuel pump 118 and the fuel filter housing 120. This embodiment uses conductive plastic or polymeric strands 122 to define an electrical conductor or electrically conductive path to the ground terminal lead 117a at the electrical plug 112. In FIG. 2, the strand or conductor extends from pressure regulator 116 to the fuel filter housing 120, and then to the bracket 107. This single strand thus connects two components of the module to the electrical system ground plane. Another strand 122 contacts the pump and motor 118 and connects to the first strand at the connection to the filter housing 120. Bracket 107 and receptacle 112 illustrate an effective arrangement to connect strands 122 to the electrical circuit ground plane. Of course, metal wire could be used in place of plastic strand 122 to provide the conductive path.

The illustrated polymeric strands are connected to the negative battery terminal at receptacle 112. Bracket 107 includes a clip 124 to secure the strand 122 to the conductive bracket for a secure physical and electrically conductive connection. Of course, a wire can be similarly connected.

The embodiment of an in-tank fuel module 110 of FIG. 2 includes a flange 111 which as in the embodiment of FIG. 1 mounts the module to a fuel tank. The flange connects to the top wall of the fuel tank and suspends the module 110 within the tank through an entry aperture closed by the flange 111. As in the earlier embodiment, the flange 111 and the reservoir generally designated 113, which carries the other components of the module are connected by a slidable connection to permit adjustment of the overall vertical extent of the module. The slidable connection includes a pair of tubular vertical support tubes 140, one of which is shown in FIG. 2 slidably received in vertical bores within pillars 123 on the reservoir member 113. Each tube 140 is surrounded by a metal wire compression coil spring 142 that urges the flange 111 and reservoir 113 toward the fully extended or elongated condition. When, for example, the reservoir section 113 of a fuel module 110 in any installation contacts the bottom of its associated tank, the springs 142 are compressed to move the flange 111 into its sealed connection with the top wall of the fuel tank.

The flange 111 is usually molded of non-conductive polymeric material as acetal. The support tubes 140 are metal and conductive. The springs 142 are, of course, also conductive. Thus, the support tubes and springs are a potential location for the build-up of electrostatic charge.

Figure 3:
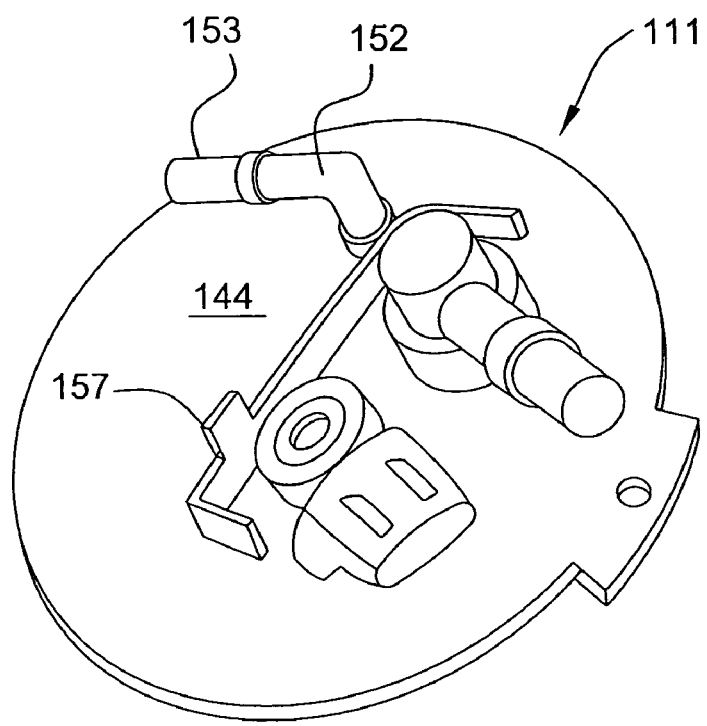
FIG. 3 is a perspective view of the top or exterior of the flange of the fuel module of FIG. 2.
Figure 4:
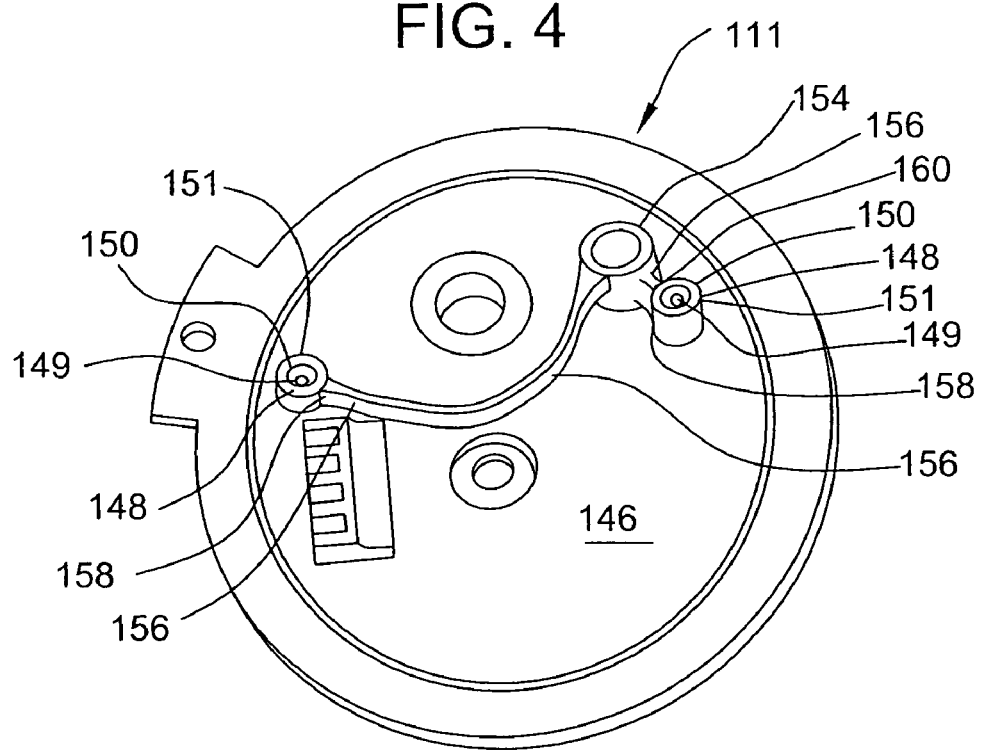
FIG. 4 is a perspective view of the under side or inner surface of the flange of FIG. 3.

FIGS. 3 and 4 illustrate an arrangement for dissipation of electrostatic charge from the metal support tubes 140 and a metal compression coil springs 142.

A flange 111 is illustrated. FIG. 3 shows the top 144, of the flange external to the fuel tank. FIG. 4 shows the underside or bottom surface 146 that faces downward, or into the tank, when the module is mounted to a tank.

Referring to FIG. 4, the bottom 146 of flange 111 includes a pair of tube posts 148 are molded into the flange. Each of these posts include an internal cylindrical surface 150 defining a bore to receive a tube 140. The outside diameter of each tube 140 is such that it is frictionally engaged within cylindrical surface 150 of one of the posts 148.

The flange 111 supports a fuel supply port member 152 which includes internal stem 154. It is arranged to receive fuel from module 110 through a flexible hose within the tank. Such a hose is illustrated at 115 in FIG. 2. The hose is conductive and usually formed of a polymeric material filled with conductive material. Port 152 connects to a fuel delivery hose at its stem 153 outside of the fuel tank. The hose connected to stem 153 delivers fuel to the associated consumption component. The hose is usually made of conductive polymeric material, or includes a conductive polymeric layer in contact with stem 153.

The flange 111 includes a conductive web 156 in the form of an overmolded polymeric band. The web or band 156 includes ends 158 that are exposed within the internal cylindrical surface 150 of tube posts 148 and a branch 160 in contact with fuel supply port 152. The ends 158 contact the outer surface of tubes 140 and define a seat 151 to contact the end of spring 142. As illustrated, ends 158 may also include a central pin 149 positioned within the bore defined by cylindrical surface 148. The outer surface of each pin 149 contacts the inner bore of a tube 14 to provide an additional conductive path from the tubes 14 to the web 156.

The web 156 provides a conductive path from posts 148 to the supply port 152. Its ends contact the metal support tubes 140 and connect the tubes 140 and metal springs 142 to the conductive supply port 152. A conductive path is thus provided to dissipate any electrostatic charge that could otherwise accumulate on the support tubes 140 or springs 142 to port 152 and to its associated conductive hose 115 forming part of the fuel module.

The web 156 is an overmolded piece formed of conductive polymeric material that is preferably the same polymer as the non-conductive flange 111. As best seen in FIG. 3, the web includes upstanding feet or "stand offs" 157 that support it in its appropriate position within the mold for injection molding of flange 111. Stabilization of its position is important to the molding process. Since it is made of the same polymer as the flange 111, the material of the web 156 and the flange 111 form a fluid tight relationship during the overmolding process.

Figure 5:
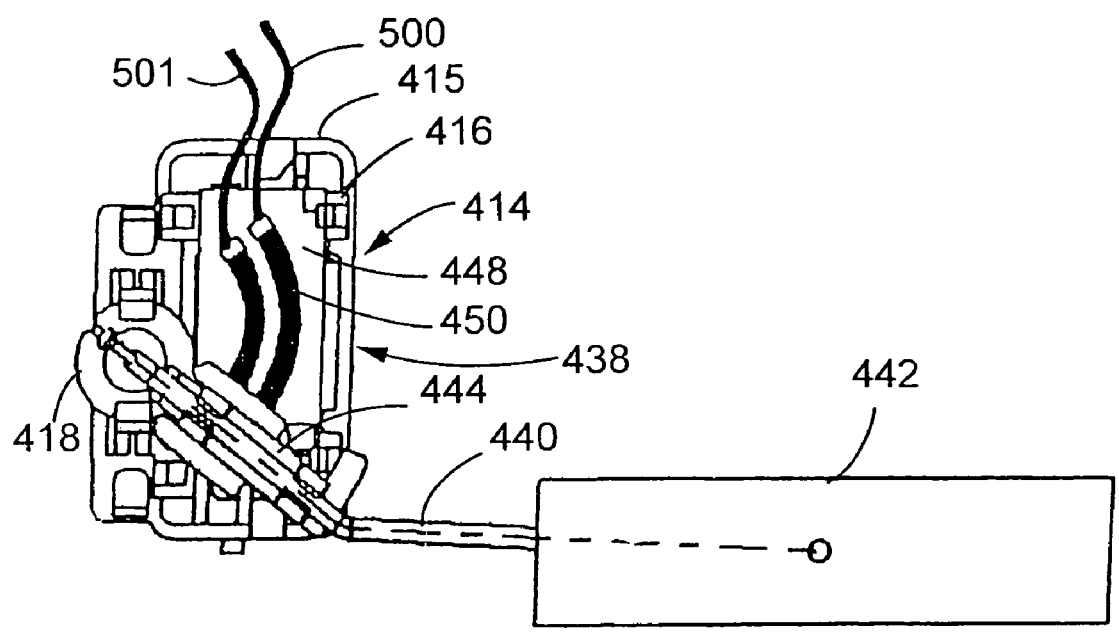
FIG. 5 is a front view of a fuel level sensor assembly incorporating principles in accordance with the present invention.
Figure 6:
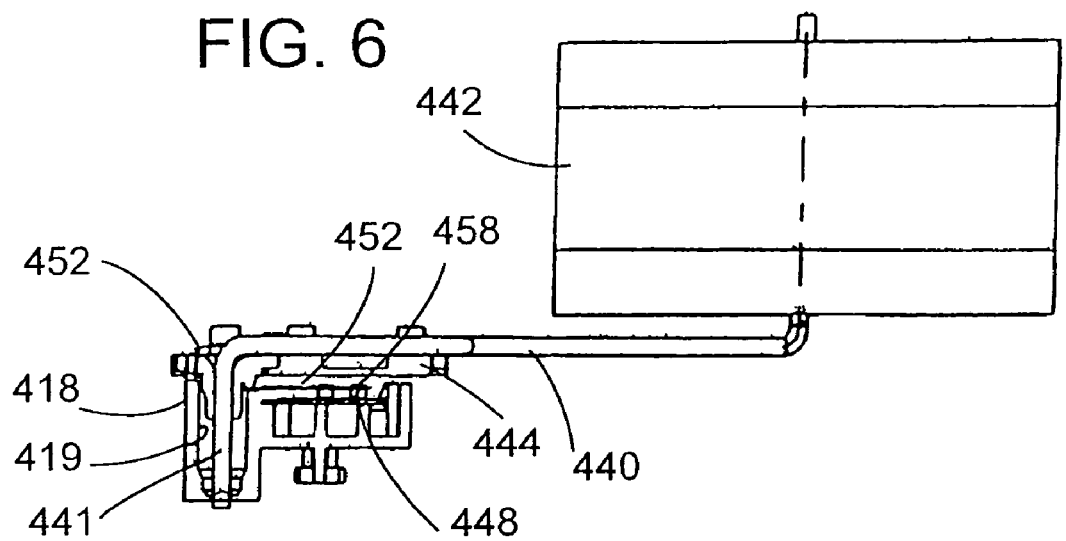
FIG. 6 is a top view of the fuel sensor assembly of FIG. 5.

Turning now to FIGS. 5 and 6, a fuel level sensor assembly 414 is shown. It includes a conductive base or conductive card body 415 mounted to an in-tank fuel module. For example, as in the configuration of FIG. 2, fuel sensor assembly 114 is mounted to the fuel filter housing 120. Often the card body or base 415 is mounted on a molded vertical pillar extending from the top of the filter housing.

The conductive card body 415 of FIGS. 5 and 6 includes a card retention section 417 with locking fingers 416. It also includes an integrally molded socket 418 defining a horizontally extending cylindrical bearing surface 419 best seen in FIG. 6. The conductive card body 415 is made of a conductive polymer, such as acetal filled with conductive material such as carbon fibrils.

A resister card 448 which forms a part of a circuit associated with the fuel level indicator is supported on card body 415. It is held in place by fingers 416. The card 448 is made of non-conductive material such as a polymer or a ceramic. As is usual, and well known, the circuit is connected to the battery circuit and therefore provides a path to the negative battery terminal or ground plane.

The resister card 448 includes a pair of separate traces 450 that typically extend in an a parallel pattern that is arc shaped.

An insulated wire 500 enters the module through receptacle 112 of FIG. 2, and connects to a first pattern of traces 450 at an end of the resister card 448. A second insulated wire 501 connects between the receptacle 112 the other pattern of traces 450 on card 448. Wire 501 is suitably connected to the negative battery terminal ground plane of the system through the receptacle 112. Wire 501 could, however, be connected to the ground plane. Either wire could be so connected through any other suitable path, such as a wire connected to the negative terminal 17a of pump motor 18 in the embodiment of FIG. 1.

An elongate metallic float arm 440 has one end portion 441 bent at 90 degrees to its length. That end is supported on a contact carrier 444. An opposite end portion is also bent at 90 degrees to its length and supports buoyant float 442.

Figure 11:
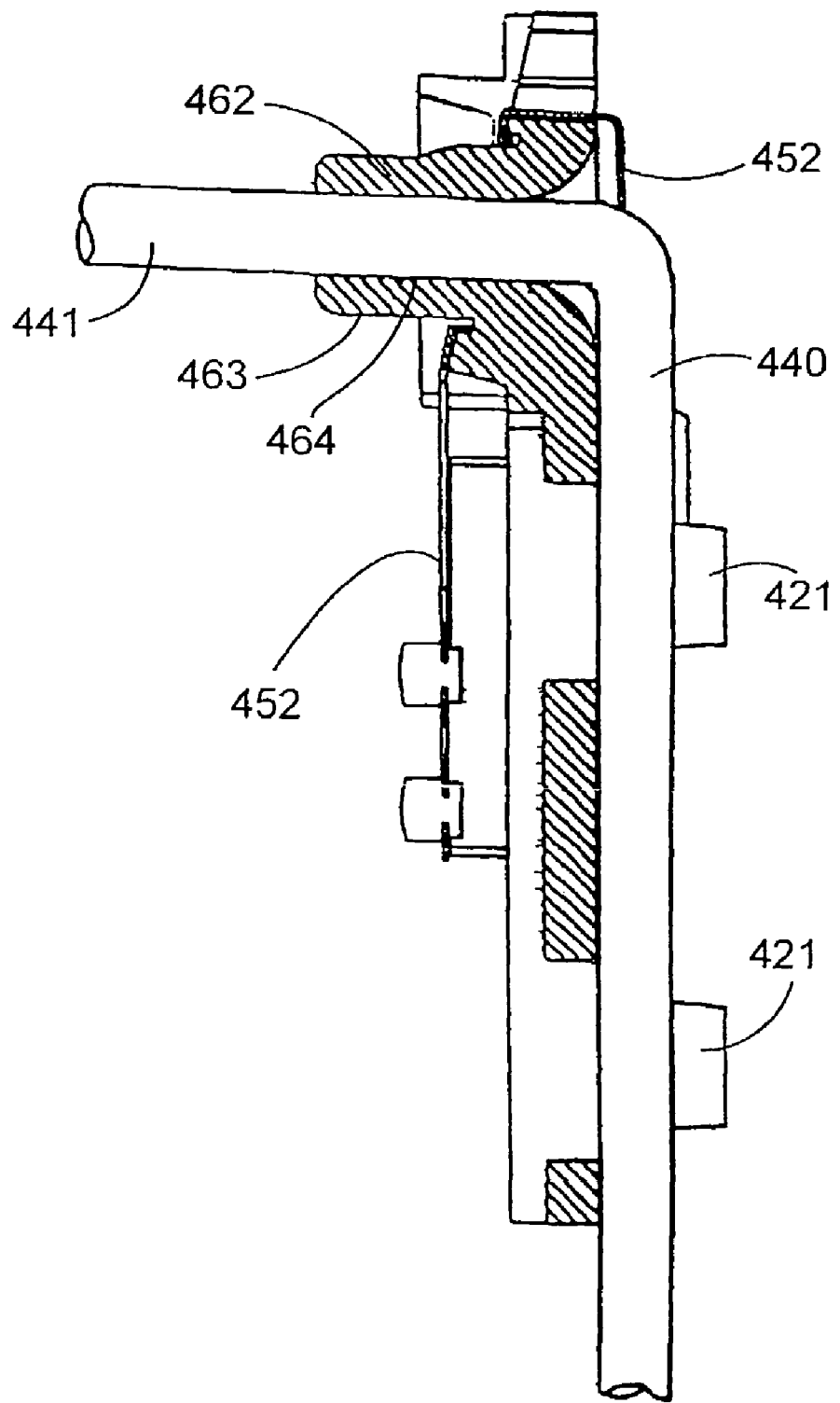
FIG. 11 is a sectional view of the contact carrier, the float arm, and the contact member of the fuel level sensor of FIG. 5 with a conductive finger formed on the contact member that contacts the float arm.

A best illustrated in FIGS. 9-11, contact carrier 444 is a molded polymeric component with an elongated body with finger 421 to receive and secure the elongated portion of the metallic float arm 440. Contact carrier 444 has a protrusion or cylindrical shaft like element 462 at one end that defines a bore 464 in which is disposed the end portion 441 of float arm 440. Protrusion 462 defines a cylindrical bearing surface 463. Surface 463 is pivotally supported upon bearing surface 419 of socket 418 on card body 415.

As the level of the fuel changes, the float 442 moves up and down causing the float arm 440 and contact carrier 444 to pivot in socket 418. As the float arm 440 pivots, contacts 458 on contact member 446 move along the arc shaped conductive traces 450 of the resistor card 448, which then alters the characteristics of the circuit and thus the signal sent to the fuel level indicator (not shown).

The contact member 446 of the present invention has a conductive finger 452 that contacts float arm 440. As illustrated, the conductive finger 452 is an extension of the contact member 446. It could, however, take the form of a separate conductive bracket (not shown) electrically connecting the float arm to the contact member, a metallic wire (not shown) electrically connecting the float arm to the contact member or a conductive plastic strand (not shown) connecting the float arm to the contact member. While all the above listed conductive portions are effective in electrically connecting the float arm to the contact member, the preferred form is the conductive finger extension of the contact member 446 illustrated in the drawings. By using the finger on the contact member 446, no additional parts are required for the electrical connection. This approach saves assembly time and money, and eliminates some failure modes, such as a potentially loose or disconnected wire.

Figure 7:
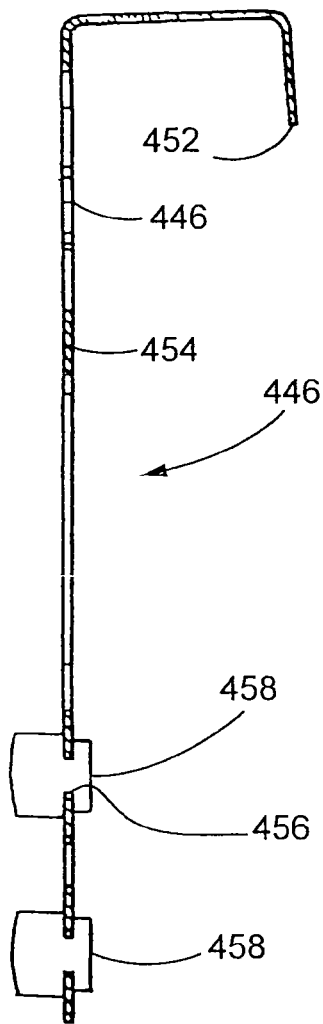
FIG. 7 is a sectional side view of a contact member of the fuel level sensor assembly of FIG. 5.
Figure 8:
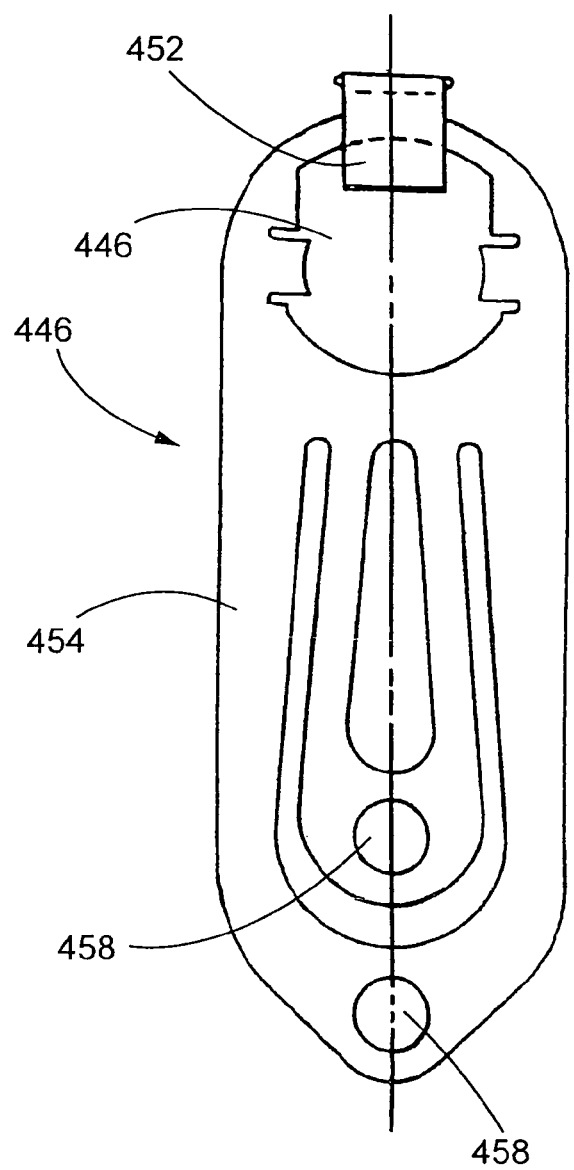
FIG. 8 is a front view of a contact member element of the fuel level sensor assembly of FIG. 5.

FIGS. 7 and 8 illustrate a contact member 446 prior to installation onto a contact carrier 444. The contact member 446 has a main plate 454 defining two small apertures 456 for attaching cylindrical contacts 454. The cylindrical contacts 458 are adapted to contact the traces 450 of the resistor card 448. The circuit across the separate traces 450 is completed through contact member 446. The main plate 454 also defines a large aperture 460 adapted for attaching the contact member 446 to the wiper retainer 444. Extending from the end of the main plate 454 is the conductive finger 452. The terminal end of the conductive finger 452 is adapted to contact the float arm 440 to form an electrical path to discharge any electrostatic charge collected in the float arm 440 to the circuit defined by the traces 450 and wires 500 and 501. The contact member 446 depicted here is one example of such a component. Various other contact member configurations and methods of attachment to the contact retainer may be employed without deviating from the present invention.

FIG. 11 illustrates the contact member 446, as illustrated in FIGS. 7 and 8, attached to the contact carrier 444, as illustrated in FIGS. 9 and 10. FIG. 11 further illustrates end portion 441 of the float arm 440 extending through the bore 464 of the contact retainer 444.

The conductive finger 452 of the contact member 446 is in contact with the float arm 440. The conductive finger 452 creates an electrical path for any electrostatic charge in the wiper arm 440 to travel to ground in a safe manner. The electrostatic charge in the float arm 440 travels from the float arm 440, through the conductive finger 454, to the main plate 454 of the contact member 446, to contacts 458, into the traces 450 of resister card 448 and to ground via the wires 500 and 501 attached to the traces on resister card 448.

It is contemplated that, alternatively, the contact carrier itself can be conductive. The conductive contact carrier can be made conductive by mixing a base non-conductive polymer, such as acetal, with conductive filler additive, such as carbon fiber or carbon fibrils. It would then connect the metal float arm 440 to ground through the contact member 446 and contacts 458 which electrically contact the traces 450 of the resister card 448.

Figure 12:
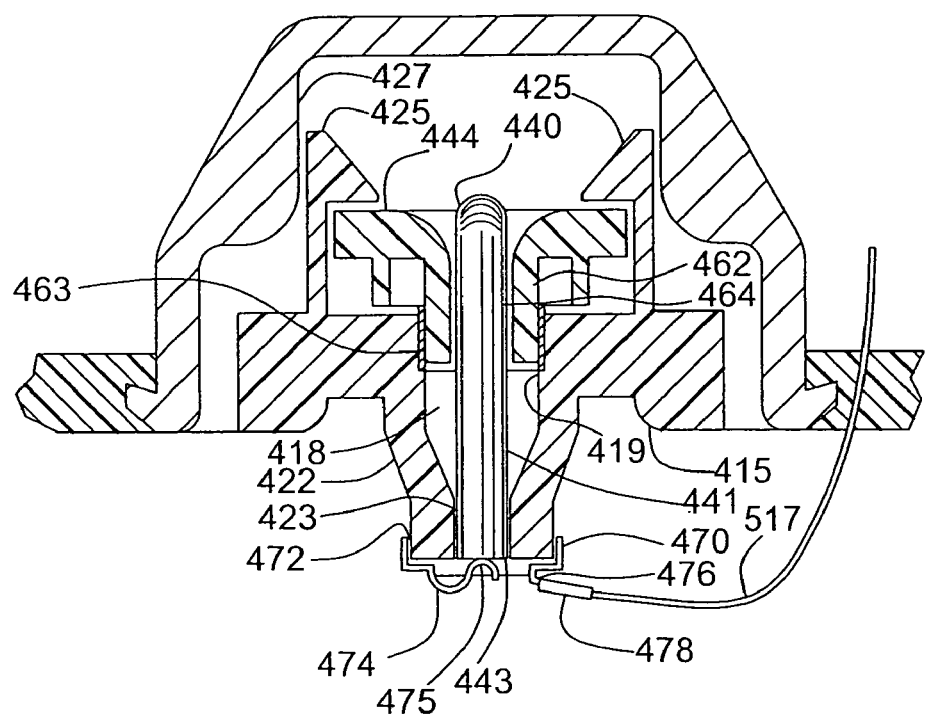
FIG. 12 is a sectional view of an alternate embodiment that provides for electrostatic charge dissipation from a float arm to the resistor card body.
Figure 13:
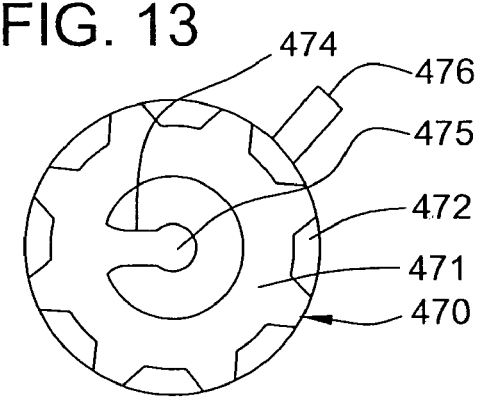
FIG. 13 is a front view of a dissipation cap of the embodiment of FIG. 12.
Figure 14:
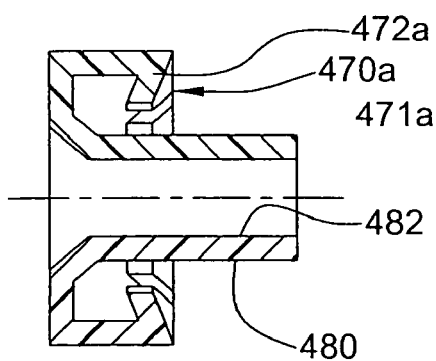
FIG. 14 is a modified form of a dissipation cap for the embodiment of FIG. 12.

Turning now to the embodiments illustrated in FIG. 12-14, there is illustrated an alternative arrangement for dissipation of any electrostatic charge that might otherwise build-up on the float wire or arm 440.

The arrangement illustrated includes a card body 415, a contact carrier 444, and a metallic float arm 440. The card body 415 holds a resister card as in the previous embodiment. It also includes socket 418 that defines a cylindrical surface 419. It further includes a conical portion 422 that defines an aperture 423. Extending in a direction opposite conical portion 422 are resilient latch members 425. In this embodiment, a cap 427 is releasably attached over the card body 415 to cover the resistor card and contacts.

Contact carrier 444 is formed as described in the previous embodiment. It includes a protrusion 462 defining a bore 464 that receives the end 441 of float arm 440. Protrusion 462 defines a cylindrical surface 463 that pivotally mounts the contact carrier 444 upon card body 415. Note that latches 425 capture the contact carrier 415 and releasably retain it in its pivotally supported relationship to the cylindrical bearing surface 419.

The metal float arm or wire 440 is shaped like the arm in the previous embodiment. It has a first end 441 bent 90 degrees to the length of the arm received in contact carrier 444. End portion 441 extends through the bore 464 in protrusion 462 of contact carrier 444 and is piloted in aperture 423 of conical portion 422 of card body 415. A tip 443 of float arm extends beyond the surface of conical portion.

As generally annular dissipation cap 470, shown in plan view in FIG. 13, is connected to the open end of conical portion 422 of card body 415. It is made of non-corrosive or plated metal and includes an annular body 471 with gripping teeth 472 that adhere the cap to the open end of conical portion 422. It also is provided with a resilient contact finger 474 that includes a contact surface 475 in abutting contact with tip 443 of float arm 440. The dissipation cap is pressed onto the end of conical portion 422 sufficiently to flex finger 474. The restoring force of the finger thereby urges surface 475 into contact with tip 443 of metal float arm 440.

The cap 470 also a terminal tab 476. A wire 517 is connected to the tab and leads to the ground plane or negative terminal of the battery. It connects within, the fuel module, to the negative lead 17a by any appropriate connection. The wire includes a push-on connector clip 478 that slips over tab 476 and frictionally adheres to it. The connection between the wire 517 and the tab can take any suitable form. They could, for example, be molded together. Also, a conductive polymeric strand could be used as previously described in connection with FIG. 2. Note that use of wire 517 contemplates that the card body 415 is made of non-conductive polymeric material. If it were, for example, made of conductive polymeric material such a metal with a filler of carbon fibrils, the wire 517 would not be necessary. The card body 415 would be connected to the negative side of the battery elsewhere, and the dissipation cap 470 would provide a dissipative path from float arm 440 to the conical portions 422 of protrusion 462.

FIG. 14 shows a modified form of dissipation cap 470a. It is also made of metal. It includes an annular body 471a and gripping teeth 472. It is intended to be placed on the conical portion 463 of a protrusion 462 of a cord body 415 as in the embodiment of FIGS. 12 and 13.

Dissipation cap 470a defines a sleeve 480 that resides within the aperture 423 of conical portion 463. It defines an inner bearing surface 482 for contact with the outer surface of end 441 of metallic float arm 440. The contact between the outer surface of the arm 440 with the inner bearing surface 482 is sufficient to provide a dissipation path to the dissipation cap 470a.

The dissipation caps 470 and 470a illustrated in FIGS. 12-14 are exemplary of an arrangement to provide a dissipative path from the metal float wire 440 to the card body 415. Numerous alternative arrangements are contemplated. For example, the cap 470 or 470a could be made of conductive polymeric material such as acetal filled with conductive material. Also, it is contemplated that the resilient contact finger 474 could be arranged to contact the outer surface of end 441 of metal float arm 440 rather then tip 443. The main principle involved is that the conductive dissipative path extends from the float wire 440 to the card body 415 through a contact element such as dissipative cap 470.

Figure 15:
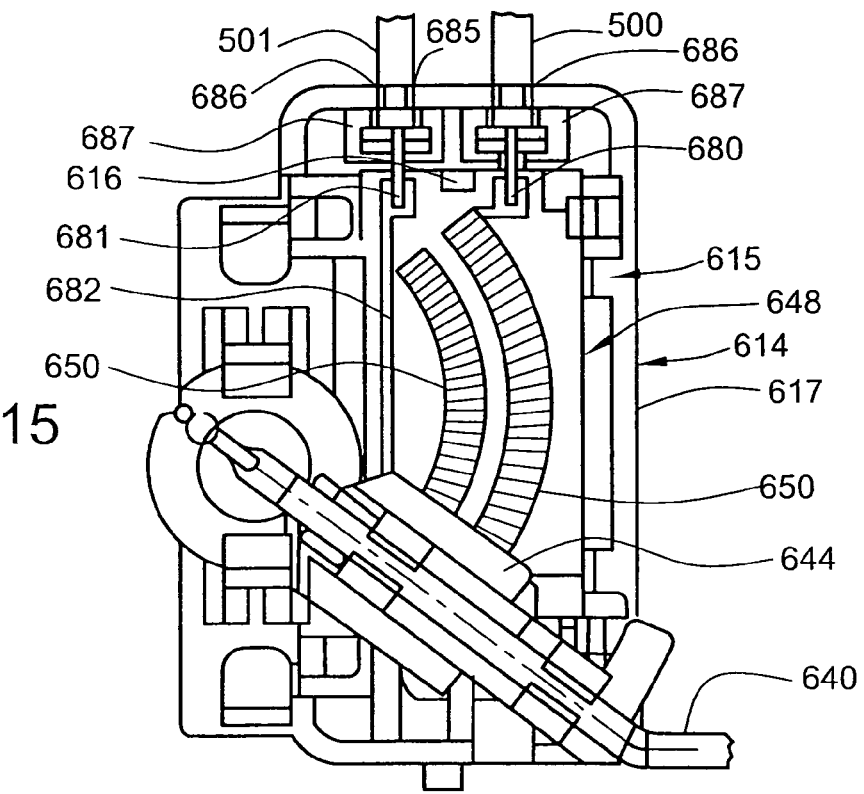
FIG. 15 is a plan view of a fuel level sensor illustrating arrangements for dissipation of electrostatic charges.
Figure 16:
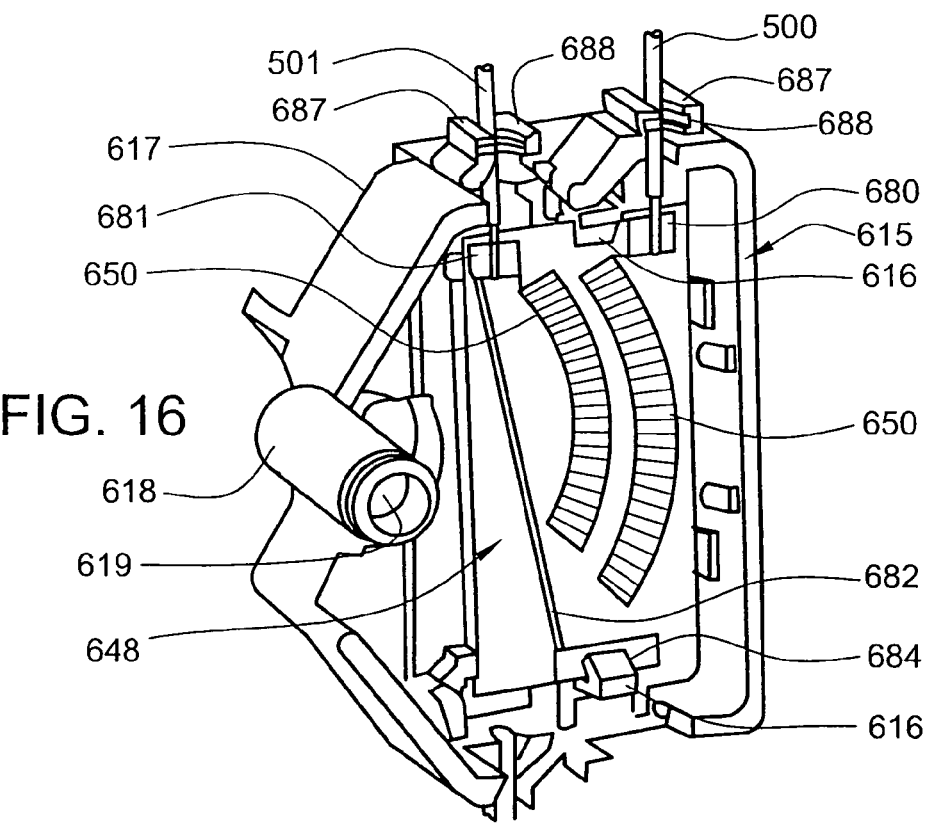
FIG. 16 is a perspective view of a fuel level sensor illustrating arrangements for dissipation of electrostatic charges.

Turning now to the embodiments of FIGS. 15-20, there are illustrated arrangements for providing a dissipative path from a card body to ground by connection to the wire or lead 500 or 501 associated with the fuel sending unit. Referring to FIGS. 15 and 16, a fuel level sensor assembly 614 is illustrated, such as the fuel sensor assembly 114 of the embodiment of FIG. 2 or 5-11. It includes a base or card body 615 mounted to an in-tank fuel module. For example, as in the configuration of FIG. 2, fuel sensor assembly 114 is mounted to the fuel filter housing 120. Often the card body or base 615 is mounted on a molded vertical pillar extending from the top of the filter housing.

The card body 615 of FIGS. 15 and 16 includes a card retention section 617 with locking fingers 616, best seen in FIG. 16. It also includes an integrally molded socket 618 defining a horizontally extending cylindrical bearing surface 619 best seen in FIG. 16. The card body 615 is made of a conductive polymer, such as acetal filled with conductive material such as carbon fibrils. Alternatively, the conductive card body 415 can be made conductive by molding or applying a layer of conductive material, such as a conductive polymer, to at least one surface of an otherwise non-conductive card body.

A resister card 648 which forms a part of a circuit associated with the fuel level indicator is supported on card body 615. It is held in place by fingers 616. The card 648 is made of non-conductive material such as a polymer or a ceramic. As is usual, and well known, the fuel level sensing circuit is connected to the battery of the vehicle and therefore provides a path to the negative battery terminal or ground plane.

The resister card 648 includes a pair of separate traces 650 that typically extend in an a parallel pattern that is arc shaped.

An insulated wire 500 enters the module through receptacle 112 of FIG. 2, and is soldered to a first pattern of traces 650 near one end of the resister card 648 at terminal connection 680. A second insulated wire 501 connects between the receptacle 112 the other pattern of traces 650 on card 648. Wire 501 is soldered to the second trace pattern at terminal connection 681. Wire 501 is suitably connected to the negative battery terminal ground plane of the system through the receptacle 112 shown in FIG. 2. Wire 500 could, however, be connected to the ground plane. Either wire could be so connected through any other suitable path, such as a wire connected to the negative terminal 17a of pump motor 18 in the embodiment of FIG. 1.

The arrangement of FIGS. 15-20, as in the embodiment of FIGS. 5-11, includes an elongate metallic float arm 640 supported on a contact carrier 644. An opposite end of the arm 640 supports a buoyant float, such as the float 442 of the embodiment of FIGS. 5-11.

A best illustrated in connection with the embodiment of FIGS. 9-11, contact carrier 644 has an elongated body that receives and secures the metallic float arm 640. Contact carrier 644 is pivotally supported upon bearing surface 619 of socket 618 on card body 615. It carries contact as described in connection with the embodiment of FIGS. 5-11 that contact the traces 650 on resistor card 648 to define a sensed signal for indication of fuel level.

As the level of the fuel changes, the float moves up and down causing the float arm 640 and contact carrier 644 to pivot. As the float arm 640 pivots, contact carrier 644 moves the contacts along the arc shaped conductive traces 650 of the resistor card 648, and alters the characteristics of the circuit and thus the signal sent to the fuel level indicator (not shown).

Resistor card 648 of the embodiment of FIGS. 15 and 16 includes a separate conductive path or trace 682 best illustrated in FIG. 16 that connects to terminal connection 681. It also extends to exposed conductive surface 684 located under a locking finger 616. Finger 616 makes conductive contact with surface 684.

The above arrangement provides a conductive path or at least a path sufficient for dissipation of electrostatic charge from card body 615 to the ground plane or negative battery terminal. Any charge that might accumulate on conductive card body 615, and if the metal dissipation caps of the embodiment of FIGS. 12-14 are employed, the float arm 640, travels through locking finger 616 to conductive surface 684 and along separate conductive trace 682 to the junction with wire 501 at terminal connection 681. The conductive trace 682 could, of course, connect anywhere along trace 650. However, by connecting directly to connector 681 any electrostatic charge dissipated along this path goes directly to wire 501 and does not involve traces 650 on resistor card 648. This way there is no potential for interference or undesirable input to the sending circuit which involves the resistor traces 650 and contacts carried by contact carrier 644.

FIGS. 15-20 illustrate another mechanism for creating a dissipative path to the wires 500 and 501 of the fuel level sensor assembly 614. In the embodiment illustrated, this mechanism provides a ground path from the card body to one or both wires 500 and 501.

As seen in FIG. 15, in the embodiment illustrated, card body 615 includes support brackets 685 defining spaced wire retention jaws 686. The jaws are spaced apart a distance slightly smaller than the outer diameter of insulated wires 500 and 501 such that the wires are releasably retained between the insulated outer surface of the wire and the jaws 686 of bracket 685. This relationship holds wires 500 and 501 in place. Support brackets 685 are not a part of the invention and need not be employed to enjoy the benefit of the disclosed electrostatic dissipative arrangement.

As best seen in FIG. 16, card body 615 includes grounding brackets 687 one of which is associated with each insulated wire 500 and 501.

Figure 19:
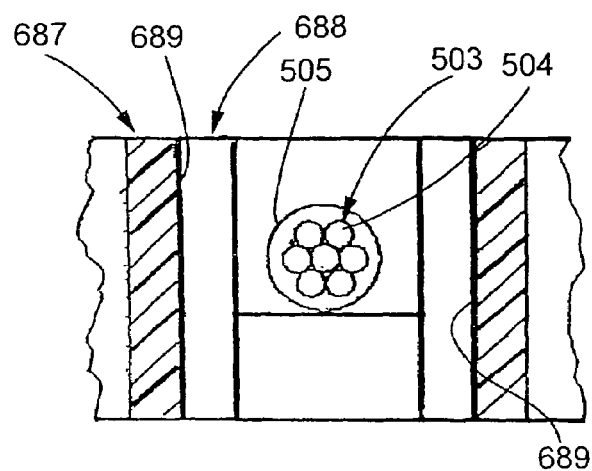
FIG. 19 is a fragmentary view partially in section of a portion of the apparatus of FIG. 16.
Figure 20:
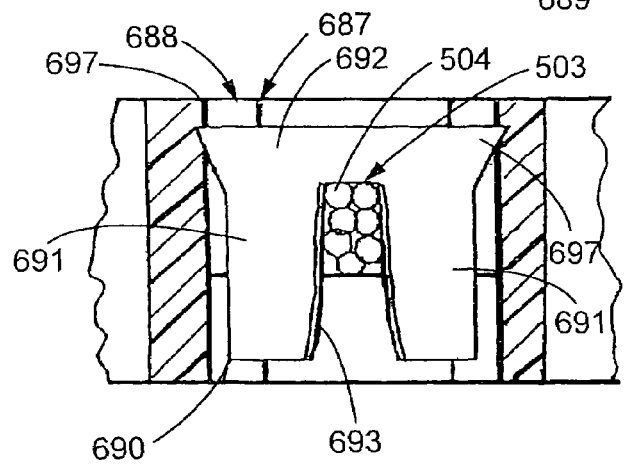
FIG. 20 is a fragmentary view partially in section of the apparatus of FIG. 16 showing the conductive connection blade of FIG. 17 in place on the fuel level sensor of FIG. 16.

Referring to FIGS. 19 and 20 grounding brackets 687 define a blade receptacle 688 forming slot generally surrounding each wire 500, 501. The slots of blade receptacle 688 include spaced walls 689.

Figure 17:
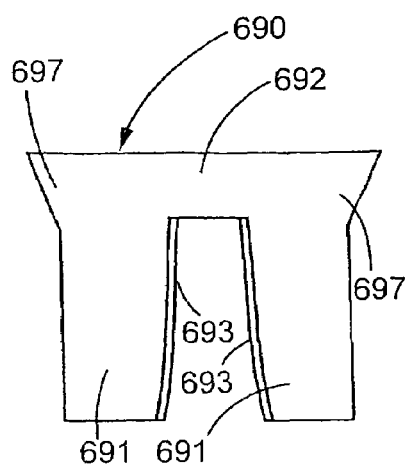
FIG. 17 is a plan view of a conductive connection blade of the fuel level sensor of FIG. 16.
Figure 18:
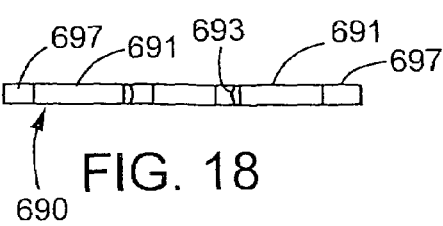
FIG. 18 is a bottom view of the conductive connection blade of FIG. 17.

A conductive connection blade 690, shown in detail in FIGS. 17 and 18, is disposed within each slot between walls 689. As best seen in FIG. 17, connection blade 690 is a generally U-shaped member having legs 691 and a cross element 692. The legs include inner, facing knife edges 693 spaced apart a distance smaller than the diameter of the uninsulated conductor 503 of insulated wire 500 and 501. The conductor 503, as illustrated in FIGS. 19 and 20, is made of a plurality of strands 504 covered by insulation 505.

The connector blade 690 includes transverse points 697 that are intended to imbed into the slot defining surfaces or walls 689 of grounding brackets 687 to hold the connecting blade 690 in place. As illustrated in FIG. 18, the connecting blade is narrow and sized to slide into the slots formed in blade receptacle 688.

To complete a conductive or electrostatic dissipative connection between one or more of the wires 500 and 501, a conductive connection blade 690 is inserted into the slot between spaced walls 689. The knife edges 693 on the inner surface of legs 691 cut through the insulation 505 and make conductive contact with the uninsulated conductor 503. The points 697 imbed into wall surfaces 689 to hold the connection blade in place. Notably, it is only necessary to connect one of the wires 500 or 501 and preferably the wire 501 to the card body using a connection blade 690. The slot associated with wire 500 can be left empty.

Blade 690 is made of conductive material. It could be made of metal, such as non-corrosive metal or plated metal. It could also be made of a conductive polymer, such as acetal with carbon fibrils or metallic filler such as finely ground stainless steel particles.

It should be noted that the grounding brackets 687, and conductive connection blade 690 can be utilized to provide a dissipative connection between any component and an insulated wire or conductive strand. It could, for example, be employed to connect strand 122, or an insulated wire to various module components in the in-tank fuel module illustrated in FIG. 2. In this regard, the grounding bracket 687 and blade 690 would replace clip 124. Such component may be a part of an in-tank fuel module, or any other device where a dissipative connection is desired.

Figure 21:
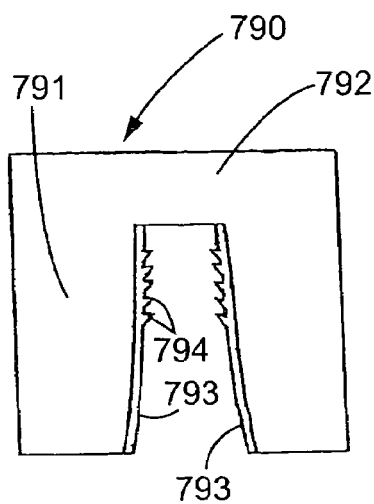
FIG. 21 is a plan view of an alternative conductive connection blade incorporating principles in accordance with the present invention.

FIG. 21 shows another embodiment of a conductive connection blade. The blade 790 is similar to the blade 690 but includes a plurality of barbs 794 extending from the knife edges 793. The blade 790 is a generally U-shaped member having legs 791 and a cross element 792. The legs include inner, facing knife edges 793 spaced apart a distance smaller than the diameter of the uninsulated conductor of the insulated wire. The blade 790 includes barbs 794 extending inwardly and upwardly allowing the knife edges 793 to slide easily over the insulated conductor when cutting the insulation but providing resistance for the knife edges 793 from separating from the conductor once the knife edges made contact with the uninsulated conductor. The blade 790 can be made of metal, such as non-corrosive metal or plated metal, or a conductive polymer, such as acetal with carbon fibrils or metallic fillers such as finely ground stainless steel particles.

The blade 790 can be utilized as part of a conductive connection from at least one conductive fuel module component, which is otherwise isolated from the ground plane, to a ground plane of a vehicle in order to dissipate any electrostatic charge that might have generated in or on the conductive fuel module component. A conductive plastic stand 122, of the type previously disclosed, can be used to form the electrical connection between the conductive fuel module component and the blade 790. Alternatively, a metal wire can be used to form the electrical connection between the conductive fuel module component and the blade 790.

Figure 22:
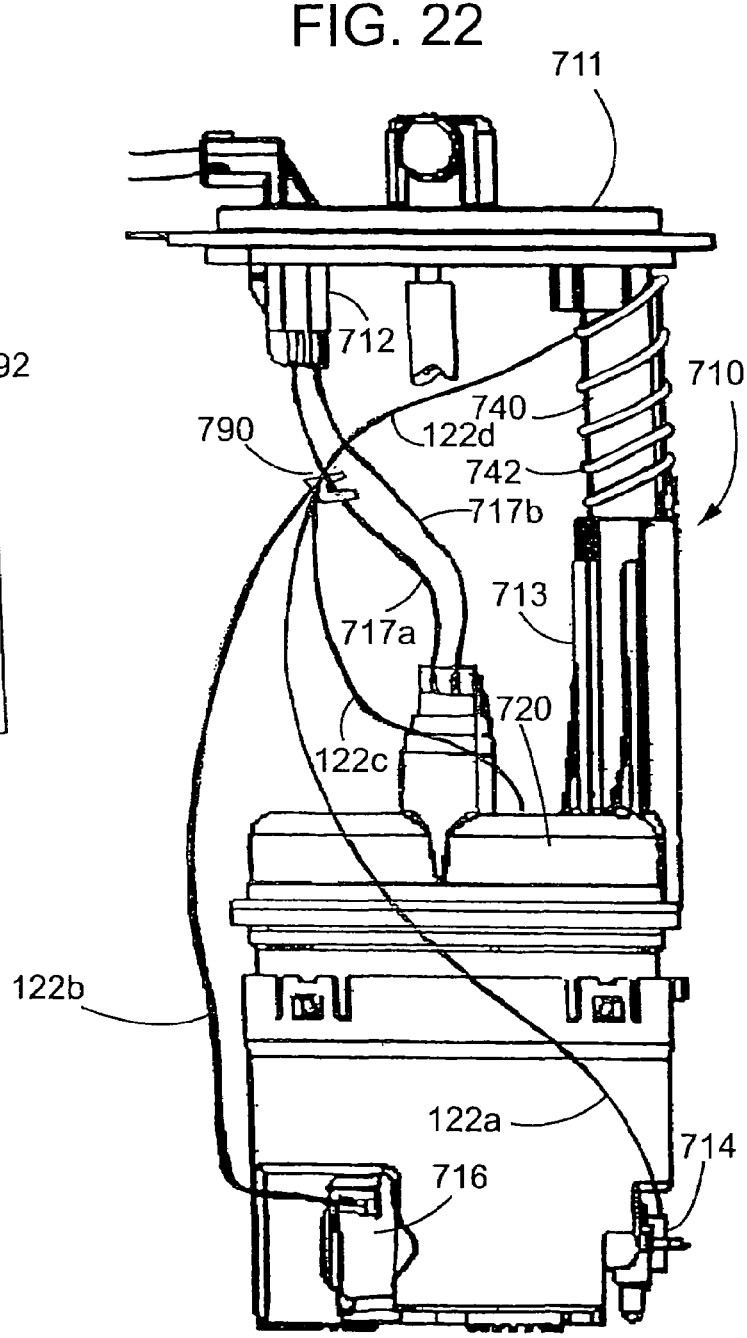
FIG. 22 is a front view of an in-tank fuel module utilizing the conductive connection blade of FIG. 21.

FIG. 22 illustrates an in-tank fuel module 710 having a plurality of separate components. The fuel module 710, includes a flange 711 which mounts the module to a fuel tank. The flange is connected to the top wall of the fuel tank and suspends the module within the tank. The flange 711 and a reservoir 713 carry the other components of the module which are connected by a slidable connection to permit adjustment of the overall vertical extent of the module. The slidable connection includes a pair of tubular vertical tubes 740. Each tube is surrounded by a metal wire compression coil spring 742 that urges the flange and reservoir toward the fully extended or elongated condition. The fuel module 710 further includes a fuel level sensor assembly 714, a fuel pressure regulator 716, a fuel pump and motor 718 and a fuel filter housing 720 which houses a fuel filter (not shown). An electrical plug or receptacle 712 is provided for connection to the vehicle electrical system. It includes at least a positive and a negative terminal. Positive and negative leads 717a and 717b are connected to the pump motor 718. Upon assembling the fuel module 710 to a vehicle, the lead 717a is electrically connected to a grounded portion of the vehicle or other chassis components.

A plurality of plastic strands 122 electrically connect the blade 790 to the conductive fuel module components. A strand 122a electrically connect the fuel level sensor assembly 714, including its conductive float arm, to the blade 790. Another strand 122b electrically connect the fuel pressure regulator 716 to the blade 790. A third strand 122c electrically connect the fuel filter housing 720 to the blade 790. A fourth strand 122d electrically connect the tube 740 and the spring 142 to the blade 790. To complete a conductive or electrostatic dissipation connection between the conductive fuel module components and a ground plane, the blade 790 is slid around the lead 717a with the knife edges 793 cutting through the insulation of the lead 717a and making contact with the uninsulated conductor of the lead 717a. Once the knife edges 793 is in contact with the uninsulated conductor, the barbs 794 of the knife edges prevent the blade 790 from separating from the lead 717a.

Various features of the present invention have been described with reference to the above embodiments. It should be understood that modification may be made without departing from the spirit and scope of the invention.

I claim:

1. A fuel level sensor assembly of a fuel module comprising:
   a conductive card body; and
   a resister card supported on said conductive card body, said resister card includes a conductive trace in conductive contact with said conductive card body and adapted to be placed in conductive contact with a ground plane to provide a path for dissipation of electrostatic charge from said card body to the ground plane.

2. The fuel level sensor assembly of claim 1 wherein said conductive card body is in conductive contact with a conductive fuel module component.

3. The fuel level sensor assembly of claim 2 wherein said conductive fuel module component is a conductive float arm pivotally supported on said card body.

4. The fuel level sensor assembly of claim 3 further comprises a contact member attached to said float arm, said resister card further includes a second conductive trace and a third conductive trace, said conductive trace and said third conductive trace are in conductive contact with said contact member.

5. The fuel level sensor assembly of claim 4 further comprises a non-conductive contact carrier attaching said contact member to said float arm.

6. The fuel level sensor assembly of claim 5 wherein said contact carrier is made of a non-conductive polymeric material.

7. The fuel level sensor assembly of claim 4 wherein said contact member includes two contacts, said second conductive trace contacts one of said contacts of said contact member, said third conductive trace contacts other of said contacts of said contact member.

8. The fuel level sensor assembly of claim 4 wherein said second conductive trace and said third conductive trace are arc shaped.

9. The fuel sensor assembly of claim 4 wherein said second conductive trace and said third conductive trace are adapted to be placed in the electrical circuit of the fuel level sensor.

10. The fuel sensor assembly of claim 4 wherein said second conductive trace and said third conductive trace are conductively insolated from each other on said resister card.

11. The fuel level sensor assembly of claim 2 further comprises a conductive float arm and a contact member attached to said float arm, said resister card further includes a second conductive trace and a third conductive trace, said second conductive trace and said third conductive trace are in conductive contact with said contact member.

12. The fuel sensor assembly of claim 11 where in said second conductive trace and said third conductive trace are adapted to be placed in the electrical circuit of the fuel level sensor.

13. The fuel sensor assembly of claim 11 wherein said second conductive trace and said third conductive trace are conductively insolated from each other on said resister card.

14. The fuel sensor assembly of claim 1 wherein said card body is made of a conductive polymer.

15. The fuel sensor assembly of claim 14 said conductive polymer is acetal filled with a conductive material.

16. The fuel sensor assembly of claim 1 wherein said card body includes a card retention section, said card retention section contacts said conductive trace.

17. The fuel sensor assembly of claim 1 wherein said resister card is non-conductive.

* * * * *